(12) United States Patent
Zimmerman et al.

(10) Patent No.: US 11,596,113 B2
(45) Date of Patent: Mar. 7, 2023

(54) CONTROLLED AGRICULTURAL SYSTEM WITH ENERGY WHEEL FOR TREATING RECIRCULATING AIR AND METHOD OF USING SAME

(71) Applicant: Harvest Air, LLC, Dallas, TX (US)

(72) Inventors: John Zimmerman, Dallas, TX (US); Christopher Whaley, Arlington, TX (US)

(73) Assignee: Harvest Air, LLC, Dallas, TX (US)

( * ) Notice: Subject to any disclaimer, the term of this patent is extended or adjusted under 35 U.S.C. 154(b) by 0 days.

(21) Appl. No.: 14/878,066

(22) Filed: Oct. 8, 2015

(65) Prior Publication Data

US 2017/0099785 A1   Apr. 13, 2017

(51) Int. Cl.
*A01G 9/18* (2006.01)
*F24F 3/14* (2006.01)
(Continued)

(52) U.S. Cl.
CPC ............... *A01G 9/18* (2013.01); *A01G 7/02* (2013.01); *A01G 9/246* (2013.01); *F24F 3/147* (2013.01);
(Continued)

(58) Field of Classification Search
CPC . A01G 9/18; A01G 9/24; A01G 9/241; A01G 9/246; A01G 7/02; A01G 9/249;
(Continued)

(56) References Cited

U.S. PATENT DOCUMENTS

| 4,093,435 A | * | 6/1978 | Marron | B01D 53/26 55/408 |
| 4,265,300 A | * | 5/1981 | Kurimoto | A01G 9/246 165/47 |

(Continued)

FOREIGN PATENT DOCUMENTS

| WO | WO2006/007698 | 1/2006 |
| WO | WO2012/072273 | 6/2012 |

OTHER PUBLICATIONS

Sultan et al., Utilization of Desiccant Air-Conditioning System for Improvement in Greenhouse Productivity: A Neglected Area of Research in Pakistan, International Journal of Environment, Mar. 2014.

(Continued)

*Primary Examiner* — Brady W Frazier
(74) *Attorney, Agent, or Firm* — Dunlap Codding, P.C.

(57) ABSTRACT

A controlled and closed agricultural system includes a growing space and an air handling system having an enthalpy wheel and cooling coil. The enthalpy wheel is capable of transferring sensible and latent heat and is positioned in and rotatable through a recirculating air duct and an outside air duct. The recirculating air duct is in fluid connection with the growing space and one or more recirculation fans, while the outside air duct is in fluid connection with one or more outside air fans positioned to cause outside air to flow countercurrent to recirculating air. A cooling coil is positioned within the recirculating air duct, downstream of and in series with the enthalpy wheel. The cooling coil circulates a heat transfer fluid to remove additional heat from the recirculating air.

21 Claims, 6 Drawing Sheets

(51) Int. Cl.
*F24F 3/147* (2006.01)
*A01G 7/02* (2006.01)
*A01G 9/24* (2006.01)

(52) U.S. Cl.
CPC ............ *F24F 3/1423* (2013.01); *A01G 9/249* (2019.05); *Y02A 40/25* (2018.01)

(58) Field of Classification Search
CPC ....... Y02P 60/146; F24F 3/1423; F24F 3/147; Y02A 40/25
USPC .......................................................... 47/17
See application file for complete search history.

(56) References Cited

U.S. PATENT DOCUMENTS

| | | | | |
|---|---|---|---|---|
| 4,567,939 | A * | 2/1986 | Dumbeck | E02D 31/008 165/224 |
| 5,579,647 | A * | 12/1996 | Calton | F24F 3/1411 62/223 |
| 5,650,221 | A * | 7/1997 | Belding | B01D 53/28 162/157.5 |
| 6,199,388 | B1 | 3/2001 | Fischer, Jr. | |
| 6,446,385 | B1 | 9/2002 | Crutcher | |
| 6,751,964 | B2 * | 6/2004 | Fischer | F24F 3/1423 62/271 |
| 7,502,655 | B2 | 3/2009 | Albright et al. | |
| 7,753,766 | B2 * | 7/2010 | Master | H05K 7/20745 165/8 |
| 7,886,986 | B2 * | 2/2011 | Fischer, Jr. | F24F 3/1423 62/271 |
| 8,327,652 | B2 * | 12/2012 | Nakaguro | B60H 3/02 62/244 |
| 8,393,549 | B2 * | 3/2013 | Pieper | F24F 3/1423 236/440 |
| 8,790,451 | B1 * | 7/2014 | Narayanamurthy | B01D 53/263 96/111 |
| 9,109,808 | B2 * | 8/2015 | Gerber | F24F 3/1417 |
| 9,383,116 | B2 * | 7/2016 | Lee | F24F 3/1423 |
| 9,513,065 | B2 * | 12/2016 | Wiley | F28D 21/0014 |
| 9,644,875 | B2 * | 5/2017 | Ito | F24F 3/1411 |
| 9,730,397 | B2 * | 8/2017 | Houweling | A01G 9/246 |
| 9,907,214 | B2 * | 2/2018 | Dagley | F24F 12/003 |
| 9,976,822 | B2 * | 5/2018 | Wintemute | F28D 19/041 |
| 2004/0194371 | A1 | 10/2004 | Kinnis | |
| 2005/0005510 | A1 * | 1/2005 | Brault | A01G 9/246 47/17 |
| 2010/0242507 | A1 * | 9/2010 | Meckler | F24F 3/1423 62/94 |
| 2011/0041395 | A1 | 2/2011 | Newbold et al. | |
| 2012/0260689 | A1 | 10/2012 | Veltkamp | |
| 2014/0235157 | A1 * | 8/2014 | Wawryk | F24F 12/001 454/233 |
| 2015/0096714 | A1 * | 4/2015 | Dagley | F24F 12/003 165/8 |
| 2015/0282440 | A1 * | 10/2015 | Shelor | A01G 9/18 47/17 |
| 2015/0375199 | A1 * | 12/2015 | Tan | B01J 20/28035 502/402 |

OTHER PUBLICATIONS

Kimball et al., Tomato Yields form $CO_2$-enrichment in Unventilated and Conventionally Ventilated Greenhouses, J. Amer. Soc. Hort. Sci. 104(4): 515-520, Jul. 1979.
Bakker et al., Greenhouse Colling and Heat Recovery using Fine Wire Heat Exchangers in a Closed Pot Plant Greenhouse: Design of an Energy Producing Greenhouse, Proc. IS on Greenhouse Cooling Ed. B.J. Bailey, Acta Hort. 719, ISHS, 2006.
Gelder et al., Tomato Yield in a Closed Greenhouse and Comparison with Simulated Yields in Closed and Conventional Greenhouses, 2005.
Buchholz et al., Temperature and Humidity Control in the Watergy Greenhouse, 2006.
Buchholz et al., Concept for Water, Heat and Food Supply from a Closed Greenhouse—the Watergy Project, Proc. IC on Greensys, Eds.: G. van Straten et al., Acta Hort. 691, ISHS 2005.
International Search Report and Written Opinion (PCT/US2016/ 55530); dated Dec. 29, 2016.
Extended European Search Report dated Apr. 15, 2019, PCT/ US2016055530, 9 pages.
USPTO Office Action regarding U.S. Appl. No. 15/933,019 dated Apr. 22, 2020.

* cited by examiner

CONTROLLED AGRICULTURAL SYSTEM WITH ENERGY WHEEL FOR TREATING RECIRCULATING AIR AND METHOD OF USING SAME

BACKGROUND OF THE PRESENTLY DISCLOSED INVENTIVE CONCEPTS

1. Field of the Presently Disclosed and/or Claimed Inventive Concepts

The inventive concepts disclosed and claimed herein relate generally to systems and methods for controlling the interior environment of an enclosure, and more particularly, but not by way of limitation, to systems and methods for controlling the temperature, humidity, and optionally $CO_2$ levels in a contained space.

2. Brief Description of Related Art

Greenhouses require temperature and humidity control to maintain dry foliage and plant health. Lighting can cause excessive heat and high humidity, especially free water on the plant foliage, promotes the development of foliar diseases, such as tomato blight, gray mold, and mildews in various crops. Such diseases substantially reduce crop yield, impair product quality, and require pesticides for control.

Replacing the greenhouse air with external air is a customary method for decreasing the humidity in a greenhouse. External cold air, with low absolute humidity, replaces the warmer greenhouse air and absorbs the excess water that evaporates. However, such methods are energy inefficient and can bring unwanted contaminants into the growing space.

It would therefore be desirable to have a controlled and contained growing space with recirculation of most or all of the air. It would also be desirable to have a system to control the temperature, humidity, and optionally the $CO_2$ levels in the contained growing space that does not require addition of outside air. This disclosure proposes a method and system that accomplishes this.

BRIEF SUMMARY

The inventive concepts disclosed and claimed herein relate generally to systems and methods for controlling the environment, including lighting, temperature, humidity, and optionally $CO_2$ levels in an interior of an enclosure in which plants are grown. In one embodiment, a controlled and closed agricultural system includes a growing space and an air handling system having an enthalpy wheel and a cooling coil. The enthalpy wheel is capable of transferring sensible and latent heat and is positioned in and rotatable through both a recirculating air duct and an outside air duct, the recirculating air duct adjacent the outside air duct. The recirculating air duct is isolated from the outside air duct and is in fluid connection with the growing space and one or more recirculation fans, while the outside air duct is in fluid connection with one or more outside air fans positioned to cause outside air to flow in a predetermined manner, e.g., countercurrent to the recirculating air. A cooling coil is positioned within the recirculating air duct, downstream of and in series with the enthalpy wheel. The cooling coil circulates a heat transfer fluid to remove heat from the recirculating air.

In another embodiment, a controlled and closed agricultural system includes a growing space and an air handling system having a heat wheel, a desiccant wheel, and a cooling coil. The heat wheel is capable of transferring sensible heat and is positioned in and rotatable through a recirculating air duct and an adjacent outside air duct. The desiccant wheel is capable of transferring latent heat and is positioned in series with the heat wheel and rotatable through the recirculating air duct and the adjacent outside air duct. The recirculating air duct is isolated from the outside air duct and is in fluid connection with the growing space and one or more recirculation fans. The outside air duct is in fluid connection with one or more outside air fans positioned to cause outside air to flow in a predetermined manner, e.g., countercurrent to the recirculating air. A cooling coil is positioned within the recirculating air duct, downstream of and in series with the heat wheel. The cooling coil circulates a heat transfer fluid to remove heat from the recirculating air.

In yet another embodiment, a method for treating air within a growing space of a closed agricultural system includes the following steps. Air is recirculated from a contained growing space through an air handling system having at least one energy wheel to reduce the energy content of the recirculating air. The recirculating air exiting the energy wheel(s) is passed across a cooling coil circulating a heat transfer fluid to further reduce the heat content of the recirculating air. The recirculating air passing the cooling coil is returned to the contained growing space of the closed agricultural system. Outside air is passed through the energy wheel(s) counter-current to and separated from the recirculating air.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, and drawings. The figures are not necessarily to scale and certain features and certain views of the figures may be shown exaggerated, to scale or in schematic in the interest of clarity and conciseness. All of the drawings are for the purpose of describing selected versions of the present invention and are not intended to limit the scope of the present invention. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

As will be apparent to those of skill in the art upon reading this disclosure, each of the individual embodiments described and illustrated herein has discreet components and features which may be readily separated from or combined with the features of any of the other several embodiments without departing from the scope or spirit of the present disclosure. Any recited method can be carried out in the order of events recited as well as any other order that is logically possible.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Use of the term "plurality" is meant to convey "more than one" unless expressly stated to the contrary.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Reference to an energy wheel herein and in the appending claims refers to a type of rotating air-to-air heat exchanger. An energy wheel that transfers only sensible heat is referred to herein and in the appending claims as a "heat wheel." An energy wheel that transfers only latent heat is referred to herein and in the appending claims as a "desiccant wheel." An energy wheel that can transfer both sensible heat and latent heat is referred to herein and in the appending claims as an "enthalpy wheel."

References to agricultural growing spaces are for example only, and the inventive concepts disclosed herein can be used with any closed, contained or nearly-closed and contained space.

Agricultural growing spaces generate high humidity due to plant transpiration and high sensible heat loads due to either sunlight or grow lights. To maintain a growing space with low levels of contamination, it is desirable to remove the excess heat and moisture without adding outside air to the contained growing space.

Figure 1:
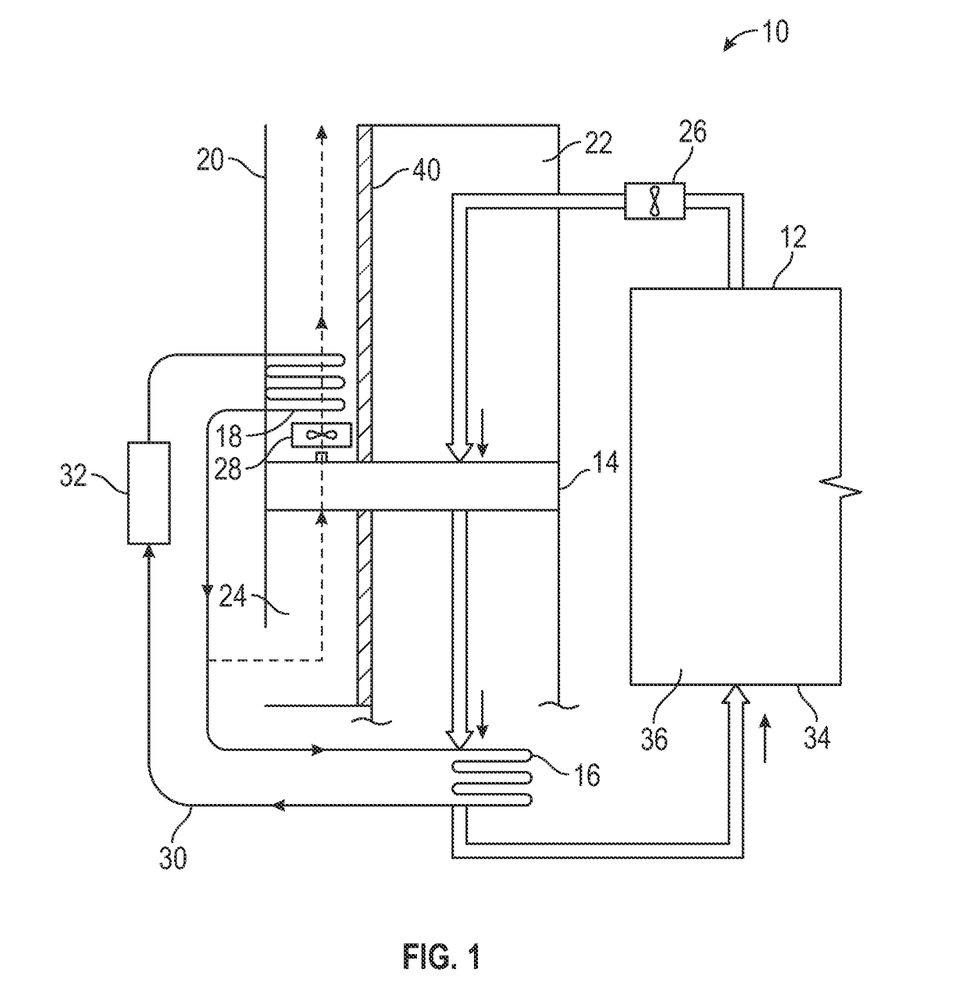
FIG. 1 illustrates an exemplary system for treating air within a closed structure for growing plants in accordance with the present disclosure.
Figure 2:
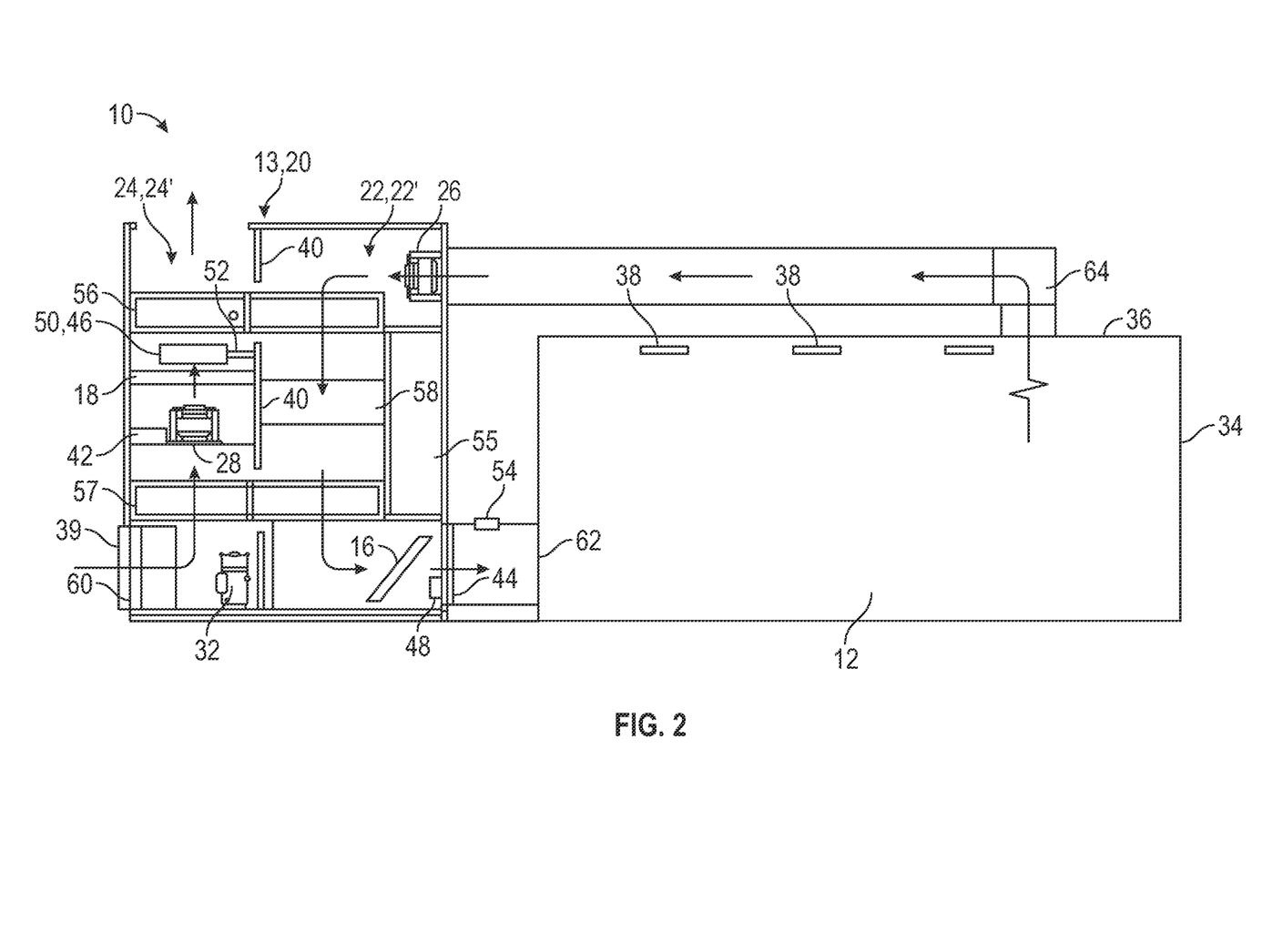
FIG. 2 is an elevation view of an exemplary closed growing space and air handling system in accordance with the present disclosure.

Referring now to FIG. 1 and FIG. 2, a controlled agricultural system 10 includes a growing space 12, and an air handling system 13. The air handling system 13 includes an enthalpy wheel 14, a cooling coil 16 and optionally a condensing coil 18. The enthalpy wheel 14 is capable of transferring sensible and latent heat and is positioned in and rotatable through a recirculating air duct 22 and an outside air duct 24 adjacent the recirculating air duct 22. The recirculating air duct 22 is in fluid connection with the growing space 12 and one or more recirculating air fans 26, while the outside air duct 24 is in fluid connection with one or more outside air fans 28 positioned to cause outside air to flow countercurrent to recirculating air. The cooling coil 16 is positioned within the recirculating air duct 22, downstream of and in series with the enthalpy wheel 14. The cooling coil 16 circulates a heat transfer fluid through a heat transfer fluid line 30 to remove heat from the recirculating air.

The controlled agricultural system 10 can be operated to control the environment within the growing space 12 defined by side walls 34 and an overhead wall 36. The side walls 34 and overhead wall 36 can be made of glass as traditional greenhouses, with louvers or the like to control the amount of sunlight entering the growing space 12. In one embodiment, the side walls 34 and overhead wall 36 are opaque to sunlight, and artificial light is provided to plants growing in the growing space 12 by grow lights 38. The use of grow lights 38 provides additional flexibility and energy savings in that the environmental factors can be controlled and therefore optimized in terms of plant yield and energy efficiency.

For example, in some climates it may be advantageous to have artificial light at night when the temperature of the growing space exterior is cooler, and darkness during the day when the temperature of the growing space exterior is much hotter, thereby lessening the heat load that must be removed from the recirculating air. Further, the use of grow lights 38 allows the duration of light and darkness to be optimized for both plant yield and energy costs.

In one embodiment, actual sunlight is completely replaced by artificial light. In another embodiment, the light wavelengths, light intensity, and light duration can be completely artificial and controlled, thereby eliminating inefficiencies associated with weather and seasonal conditions.

The growing space 12 can be conditioned year round and outside air can be avoided thereby eliminating problems due to variable seasons, pests, air contaminants such as molds, pollen, etc. The constant cooling of the air within the growing space 12 can result in significant savings in energy use and resulting costs.

In one embodiment, the air in the growing space 12 is circulated such that it is not mixed with outside air, thereby minimizing contamination of the growing space 12. Recirculating air fans 26 draw air from the growing space 12 through the air handling system 13, separated from and in counter current flow to the outside air which is pulled from outside the air handling system 13 by the outside air fans 28 and may be controlled, at least in part, by an outside air damper 39.

In one embodiment, the enthalpy wheel 14 is positioned in and rotatable through a bifurcated duct 20. A separating wall 40 bifurcates at least a portion of the duct 20, such that the separating wall 40 separates a recirculating air portion 22' from an outside air portion 24'. The recirculating air portion 22' of the bifurcated duct 20 is sometimes referred to as the recirculating air duct 22. Likewise, the outside air portion 24' of the bifurcated duct 20 is sometimes referred to herein as the outside air duct 24.

The enthalpy wheel 14 can be positioned within the bifurcated duct 20, or within the recirculating air duct 22 and the outside air duct 24, such that warm moist air recirculated from the growing space 12 passes though one portion of the enthalpy wheel 14 and outside air passes in the opposite direction through the remaining portion of the enthalpy wheel 14. Brush seals and the like may be used to maintain isolation between the recirculating air and the outside air or at least minimize contamination of the recirculating air with outside air.

Energy wheels are a type of air-to-air heat exchanger that can not only transfer sensible heat but also latent heat. When both temperature and moisture are transferred, the energy wheel is considered an enthalpy wheel. The rotating energy wheel heat exchanger is composed of a rotating cylinder filled with an air permeable material resulting in a large surface area for the sensible energy transfer. As the wheel rotates between the recirculating air portion 22' and the outside air portion 24' of the bifurcated duct 20, or through the recirculating air duct 22 adjacent the outside air duct 24, the wheel picks up sensible energy (heat) and releases the sensible energy into a relatively colder outside air stream. The driving force behind the exchange is the difference in temperatures between the opposing air streams which is also called the thermal gradient. Nonlimiting examples of suitable material used includes polymer, aluminum, and synthetic fiber.

The moisture or latent energy exchange in enthalpy wheels is accomplished through the use of desiccants. Desiccants transfer moisture through the process of adsorption which is predominately driven by the difference in the partial pressure of vapor within the opposing air streams. Nonlimiting examples of suitable desiccants include silica gel and molecular sieves.

In some environments, modulating dampers can be used to control the flowrate of outside air. Modulating the wheel speed, preheating the air, and stop/jogging the system offer additional means to control the energy transfer. Cross-contamination of the contaminants via the desiccant can also be a concern but can be avoided for example through the use of a selective desiccant like a molecular sieve.

In one embodiment, a mixing damper 42 is positioned in the outside air duct 24, or the outside air portion 24' of the bifurcated duct 20, downstream of the enthalpy wheel 14, and can be used to control the amount of outside air. For example, one or more industry standard modulating damper(s) can be positioned in parallel with the enthalpy wheel 14 and modulated in concert with the outside air damper 39 to maintain a desired operation and performance of the enthalpy wheel 14.

Temperature and relative humidity measurements can be taken using, for example, industry standard temperature and humidity sensors. Temperature and relative humidity measurements of the outside air stream entering the enthalpy wheel 14, the recirculating air entering the enthalpy wheel 14, and the recirculating air exiting the enthalpy wheel 14 can be used to control the speed of the outside air fans 28, the speed of the enthalpy wheel, and control operation of the direct expansion evaporator cooling coil 16.

The cooling coil 16 can further cool the recirculating air exiting the enthalpy wheel 14. The cooling coil 16 can circulate chilled water, a mixture of chilled water and glycol, refrigerant, and the like.

In one embodiment, chilled water is produced in another portion of the facility housing the controlled agricultural system and is utilized to further cool recirculating air exiting the enthalpy wheel 14.

In one embodiment, the cooling coil 16 is a direct expansion evaporator cooling coil. A compressor 32 and condensing coil 18 are external to the recirculating air duct 22, or the recirculating air portion 22' of the bifurcated duct 20, and use outside air to remove heat from the heat transfer fluid.

Design and operation of evaporator cooling coils are well understood by those skilled in the art. Typically condensed and pressurized liquid refrigerant is routed through an expansion valve where it undergoes an abrupt reduction in pressure. That pressure reduction results in flash evaporation of a part of the liquid refrigerant, thereby lowering its temperature. The cold refrigerant is then routed through the evaporator cooling coil. Air fans blow the recirculating air across the evaporator, causing the liquid part of the cold refrigerant mixture to evaporate as well, further lowering the temperature. The recirculating air is therefore cooled by heat transfer from the direct expansion evaporator cooling coil 16.

Circulating refrigerant vapor enters the compressor 32 and is compressed to a higher pressure, resulting in a higher temperature as well. The hot, compressed refrigerant vapor is at a temperature and pressure at which it can be condensed and is routed through the condensing coil 18 located in the outside air duct 24, or the outside air portion 24' of the bifurcated duct 20. Outside air fan(s) 28 causes outside air exiting the enthalpy wheel 14 to flow across the condensing coil 18. The cooler outside air flowing across the condensing coil 18 causes the refrigerant in the coil to condense into a liquid. Thus, in summary, the circulating refrigerant removes heat from the recirculating air and the heat is carried away by the outside air.

In one embodiment, for example when weather or other circumstances cause the recirculating air to be colder than desired, the refrigeration cycle can be reversed and refrigerant is pumped in the opposite direction. The overall effect is the opposite, and the recirculating air is heated instead of cooled.

In one embodiment, for example when the recirculating air becomes cooler than desired for recirculating to the growing space 12, one or more heaters 44 in the recirculating air duct 22, or the recirculating air portion 22' of the bifurcated duct 20, can be utilized to control the temperature of the recirculating air and the growing space 12. Nonlimiting examples of suitable heaters include electrical resistance heaters, hot water radiators, natural gas furnaces, and the like.

A $CO_2$ generator 46 can be used to add $CO_2$ to the recirculating air duct 22, or the recirculating air portion 22' of the bifurcated duct 20. An associated $CO_2$ sensor 48 can sense and read the $CO_2$ level in the recirculating air and input the level to a $CO_2$ controller 50. The $CO_2$ generator 46 is controlled by the $CO_2$ controller 50 to maintain the $CO_2$ content at a set point or set range.

In one embodiment, the $CO_2$ generator 46 comprises a natural gas burner located in the outside air duct 24, or the outside air portion 24' of the bifurcated duct 20. Locating the natural gas burner in the outside air portion allows a majority of the heat related to combustion to exhaust directly outside. Flue gas from the natural gas burner is delivered in controlled amounts to the recirculating air. A flue gas fan 52 located in the separating wall 40 can be utilized, for example to meter the flue gas to the recirculating air portion 22' of the bifurcated duct 20 and thereby maintain the $CO_2$ content at a set point or set range.

In one embodiment, a control louver 54 is also used to purge excess $CO_2$ from the recirculating air duct 22, or the recirculating air portion 22' of the bifurcated duct 20, to maintain the $CO_2$ content at a set point or set range.

In one embodiment, an industry standard $CO_2$ sensor 48 is installed in the recirculating air duct 22, or in the recirculating air portion 22' of the bifurcated duct 20. The $CO_2$ sensor 48 feeds back to the $CO_2$ controller 50 within a central control system 55 to determine if the natural gas burner should fire and at what rate the $CO_2$-containing flue gas should be metered into the air handling system 13 to meet or maintain a user-defined $CO_2$ set point.

In one embodiment, the air handling system 13 includes a separate desiccant wheel 56 for removing moisture from the recirculating air. The desiccant wheel 56 is positioned in and rotatable through both the recirculating air duct 22 and the outside air duct 24 such that warm moist air recirculated from the growing space 12 passes though one portion of the desiccant wheel 56 and heated outside air exiting the condensing coil 18 passes in the opposite direction through the remaining portion of the desiccant wheel 56. A separate heat wheel 57 capable of transferring sensible heat also positioned in and rotatable through both the recirculating air duct and the outside air duct. The heat wheel 57 cools dried recirculating air exiting the desiccant wheel 56 and transfers the sensible heat to outside air upstream of the desiccant wheel 56.

As described above for the enthalpy wheel 14, the desiccant wheel 56 is composed of a rotating cylinder filled with an air permeable material comprising desiccant. As the desiccant wheel 56 rotates between the recirculating air duct 22 and the outside air duct 24, it picks up moisture from the moist recirculating air and releases it into the drier outside air stream. Desiccants transfer moisture through the process of adsorption which is predominately driven by the difference in the partial pressure of vapor within the opposing air streams. Suitable desiccants include silica gel, and molecular sieves. The outside air with absorbed heat and humidity is then discharged from the air handling system 13 and returned to the atmosphere.

In one embodiment, a recirculating air filter 58 positioned in the recirculating air duct 22 removes particulate from the recirculating air before feeding it back to the growing space 12. Design and operation of air filters are well understood by those skilled in the art.

An outside air filter 60 can be positioned in the outside air duct 24 to remove particulate from the outside air prior to passing it through the enthalpy wheel 14 or the desiccant wheel 56 and heat wheel 57. Removal of particulate can aid in reducing the maintenance of the wheels.

The central control system 55 can modulate the fans, wheel(s), and optionally the compressor to minimize energy consumption. Components of the system described above can be variable speed. The fans can vary the volume of air moved and the wheel speed(s) can vary to maximize efficiency. The mechanical cooling system including the cooling coil 16 optimally provides only the cooling necessary. Control logic for the components can be housed in a common control cabinet.

Figure 3:
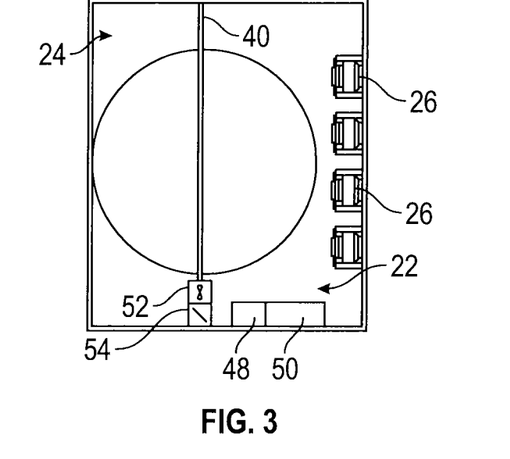
FIG. 3 is a plan view of an upper deck of the air handling system of FIG. 2.
Figure 4:
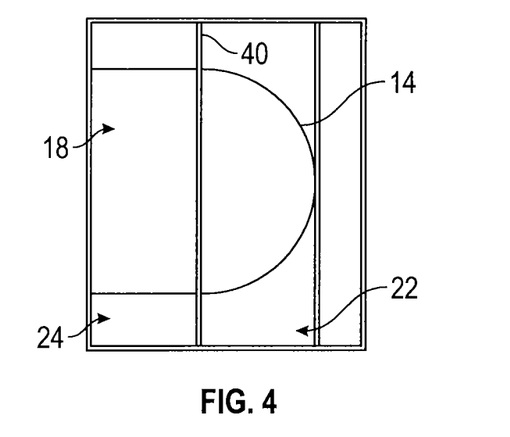
FIG. 4 is a plan view of a middle deck of the air handling system of FIG. 2.
Figure 5:
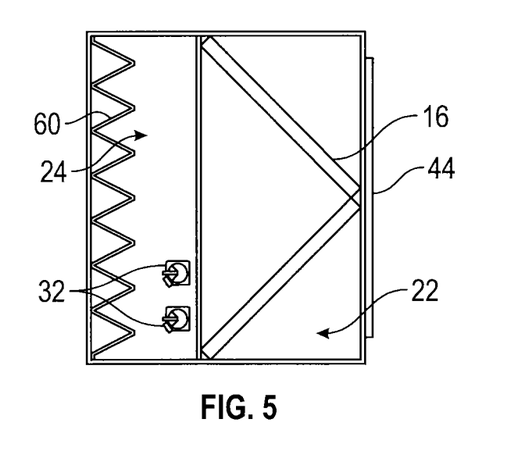
FIG. 5 is a plan view of a lower deck of the air handling system of FIG. 2.

In the embodiment shown in FIG. 2, the air handling system 13 is constructed adjacent to the growing space 12 with a recirculating air outlet 62 originating from a far side of the growing space 12, and a recirculating air intake 64 proximate the air handling system 13. While numerous layouts can be used, separation of the recirculating air outlet and intake 62 and 64, respectively, improves efficiency of air replacement in the growing space 12. FIG. 3 through FIG. 5 show possible equipment layouts in three levels of the air handling system 13.

A method for treating air within a growing space of a closed agricultural system includes temperature and moisture control equipment as described above. Recirculating air from a contained growing space is passed through an air handling system comprising at least one energy wheel to reduce the energy content of the recirculating air. The recirculating air exiting the energy wheel(s) is passed across a cooling coil circulating a heat transfer fluid to further reduce the heat content of the recirculating air. The recirculating air passing the cooling coil is then returned to the contained growing space. Outside air is passed through the energy wheel(s) counter-current to and separated from the recirculating air.

In one embodiment, the recirculating air exiting the energy wheel(s) can be passed across a direct expansion evaporator cooling coil circulating a heat transfer fluid to further reduce the heat content of the recirculating air before returning the air to the main portion of the closed structure. The heat transfer fluid is cooled by circulating through a compressor and a condensing coil in contact with the outside air.

In one embodiment the energy wheel comprises an enthalpy wheel to reduce the temperature and the moisture content of the recirculating air. In another embodiment, the energy wheels comprise both a desiccant wheel to reduce the moisture content of the recirculating air and a heat wheel to reduce the temperature of the recirculating air.

The method for treating air within a growing space of a closed agricultural system can additionally include monitoring the $CO_2$ content of air circulated from the growing space. $CO_2$ is added if the $CO_2$ content is below a desired value, and a portion of the recirculating air is vented if the $CO_2$ content is above a level determined to be harmful.

In the following examples, specific controlled and closed agricultural systems are described. However, the present inventive concept(s) is not to be limited in its application to the specific equipment, plant layout, and operating methods. Rather, the Examples are simply provided as one of various embodiments and are meant to be exemplary, not exhaustive.

Example 1

Figure 6:
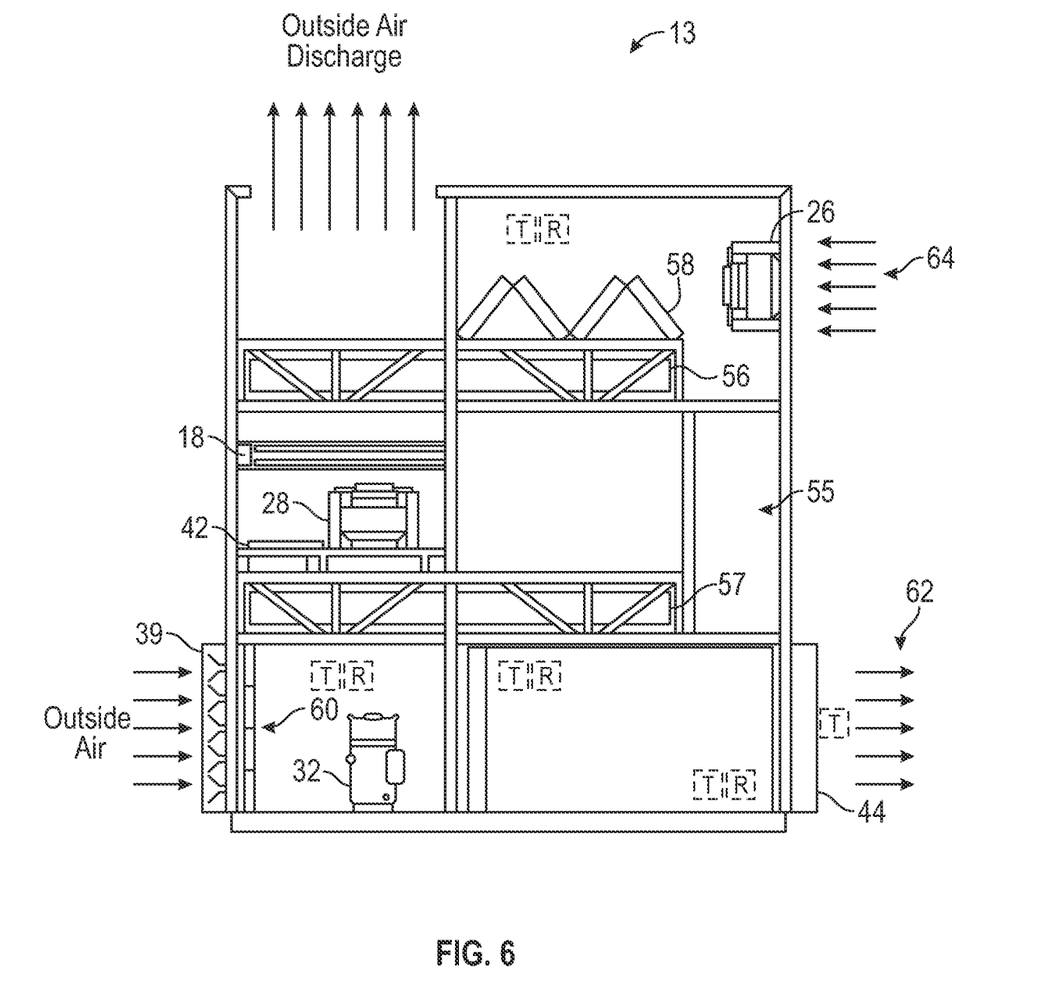
FIG. 6 is a plan view of the air handling system described in Example 1.

In some applications, the humidity level in the closed agricultural system requires more extensive dehumidification than normal. As shown in FIG. 6, a desiccant wheel is installed downstream of the recirculation fans and condensing coil. The enthalpy wheel is replaced with a heat wheel (sensible heat-only wheel, no desiccant). A condensing coil or a natural gas burner acts as regeneration heat for the latent heat-only wheel. As the desiccant wheel rotates from one air stream to the other it adsorbs the moisture from the recirculation air. That moisture is then released to the outside air stream. To aid in that release, regeneration heat (condensing coil heat and/or optional natural gas burner) is applied to the air entering the wheel in the outside air stream. An additional set of temperature and relative humidity sensors are installed downstream of the desiccant wheel. The control system varies the speed of the desiccant wheel to meet the user defined relative humidity set point. Similarly, the control system varies the heat wheel to meet the user defined temperature set point.

Example 2

Figure 7:
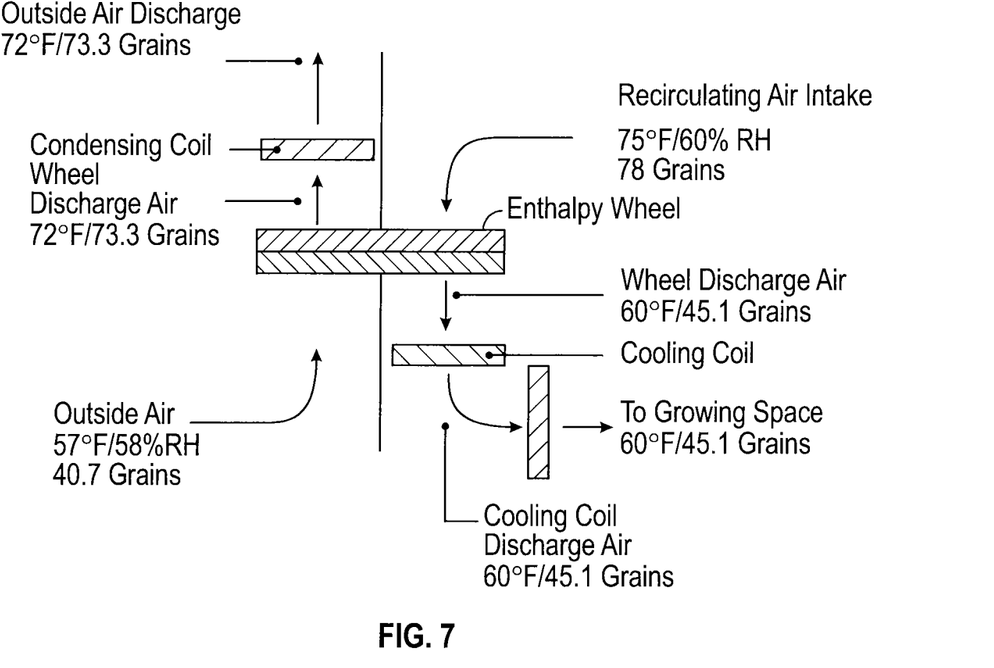
FIG. 7 is a flow diagram for the air handling system described in Example 2.

The efficiency of the air handling system depends on the outside air temperature and humidity. When conditions are favorable (cooler dryer weather), the system is capable of transferring the heat and humidity of the recirculation air through the enthalpy wheel to the cooler and dryer outside air. As indicated in the flow diagram shown in FIG. 7, 57° F. outside air with 40.7 grains of moisture is coming into the unit and into the enthalpy wheel. The resulting recirculation air temperature and grain level off the wheel (60° F./45.1 grains) to provide 100% of the required heating and dehumidification.

Example 3

Figure 8:
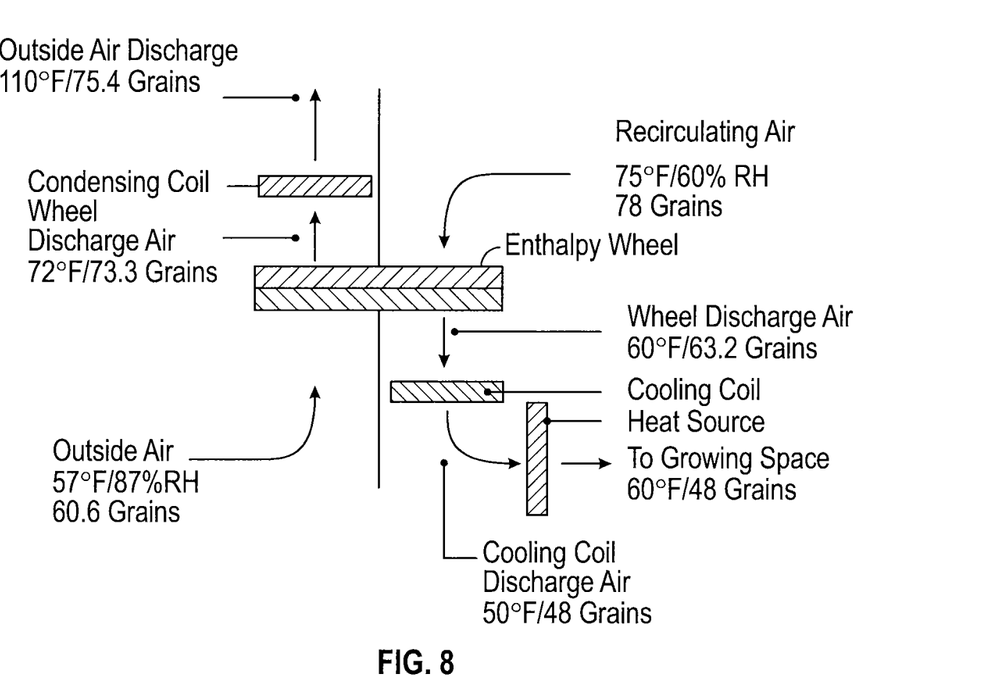
FIG. 8 is a flow diagram for the air handling system described in Example 3.

As the outside air temperature and humidity go up, the enthalpy wheel can still provide value by "pre-conditioning" the recirculation air before the cooling coil. In the flow diagram shown in FIG. 8, 57° F. outside air with 60.6 grains is entering the air handling unit and the enthalpy wheel. The resulting recirculation air temperature and grain level off the wheel (60° F./63.2 Grains) is sufficient to cool the recirculating air, but it is not sufficient to remove the moisture from the recirculating air. As a result the air handling unit control system shall enable the mechanical cooling to remove the additional grains of moisture from the recirculation air, down to the user defined set point of 48 grains. In order to remove the moisture the cooling coil must over cool the air, 50° F. The over cooled air could potentially over cool the recirculating air, therefore the air handling unit control system shall enable the heat source to heat the recirculating air to the user defined set point.

Example 4

Figure 9:
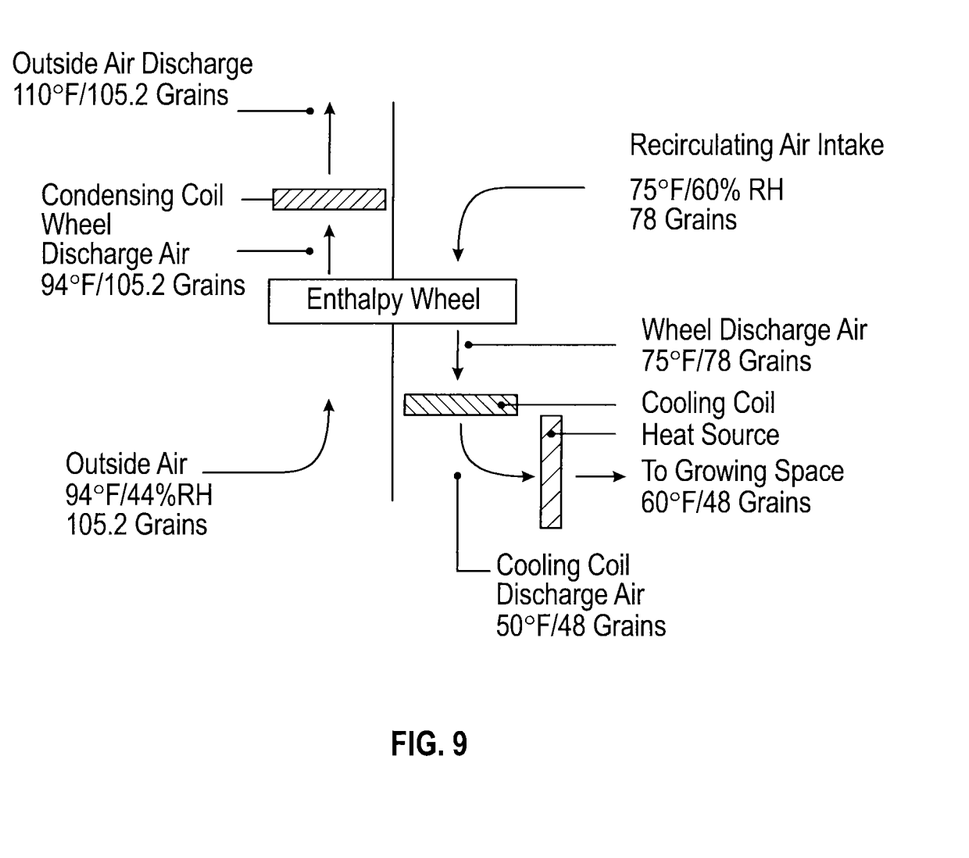
FIG. 9 is a flow diagram for the air handling system described in Example 4.

At some point the outside air will be too hot and too wet for the air handling system to be able to transfer heat and humidity form the recirculating air stream to the outside air stream. In the flow diagram shown in FIG. 9, when the control system determines that there is no benefit from the enthalpy wheel, the wheel shall stop. At this point the air handling unit is capable of mechanically cooling all the recirculating air to meet the user defined set point.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A controlled agricultural system, comprising:
an enclosure having sidewalls and an overhead wall defining an agricultural growing space; and
an enthalpy wheel capable of transferring sensible and latent heat, the enthalpy wheel positioned in and rotatable through both a recirculating air duct and an outside air duct, the recirculating air duct adjacent the outside air duct and in fluid connection with the agricultural growing space and one or more recirculation fans, the recirculating air duct configured to recirculate air from the agricultural growing space back to the agricultural growing space, the outside air duct in fluid connection with one or more outside air fans positioned to cause outside air to flow countercurrent to recirculating air, wherein
the agricultural growing space and the recirculating air duct are not vented to or from the outside air.

2. The controlled agricultural system of claim 1, wherein the enclosure comprises a greenhouse.

3. The controlled agricultural system of claim 1, wherein the sidewalls comprise light impermeable outer walls and grow lights positioned inside the agricultural growing space.

4. The controlled agricultural system of claim 1, further comprising a cooling coil within the recirculating air duct, downstream of and in series with the enthalpy wheel, the cooling coil circulating a heat transfer fluid to remove heat from air within the recirculating air duct.

5. The controlled agricultural system of claim 4, wherein the cooling coil comprises a direct expansion evaporation cooling coil.

6. The controlled agricultural system of claim 5, further comprising a compressor and a condensing coil external to the recirculating air duct for removing heat from the heat transfer fluid.

7. The controlled agricultural system of claim 1, further comprising a heat source positioned to provide heat within the recirculating air duct downstream of the enthalpy wheel.

8. The controlled agricultural system of claim 1, further comprising a $CO_2$ monitor positioned to monitor a $CO_2$ content in the recirculating air duct.

9. The controlled agricultural system of claim 8, further comprising a $CO_2$ generator and $CO_2$ controller in communication with the $CO_2$ monitor, the $CO_2$ generator having an outlet positioned to add $CO_2$ to the recirculating air duct.

10. A controlled agricultural system, comprising:
an enclosure having sidewalls and an overhead wall defining an agricultural growing space;
a heat wheel capable of transferring sensible heat, the heat wheel positioned in and rotatable through both a recirculating air duct and an outside air duct, the recirculating air duct adjacent the outside air duct and in fluid connection with the agricultural growing space and one or more recirculation fans, the recirculating air duct configured to recirculate air from the agricultural growing space back to the agricultural growing space, the outside air duct in fluid connection with one or more outside air fans positioned to cause outside air to flow countercurrent to recirculating air; and
a desiccant wheel capable of transferring latent heat, the desiccant wheel positioned in and rotatable through the recirculating air duct in series with the heat wheel such that recirculating air passes through the desiccant wheel prior to passing through the heat wheel, wherein
the agricultural growing space and the recirculating air duct are not vented to or from the outside air.

11. The controlled agricultural system of claim 10, wherein the enclosure comprises a greenhouse.

12. The controlled agricultural system of claim 10, wherein the sidewalls comprise light impermeable outer walls and grow lights positioned inside the agricultural growing space.

13. The controlled agricultural system of claim 10, further comprising a cooling coil within the recirculating air duct, downstream of and in series with the heat wheel, the cooling coil circulating a heat transfer fluid to remove heat from air within the recirculating air duct.

14. The controlled agricultural system of claim 13, further comprising a compressor and a condensing coil external to the recirculating air duct for removing heat from the heat transfer fluid, and wherein the cooling coil comprises a direct expansion evaporation cooling coil.

15. A method for treating air within an agricultural growing space of an agricultural system, the method comprising:
 recirculating air from the agricultural growing space through an air handling system, the air handling system comprising at least one energy wheel to reduce energy content of the recirculating air;
 returning the recirculating air to the agricultural growing space; and
 passing outside air through the at least one energy wheel, the outside air passing counter-current to and separated from the recirculating air, wherein
 the agricultural growing space and the recirculating air are not vented to or from the outside air.

16. The method of claim 15, wherein the at least one energy wheel comprises an enthalpy wheel.

17. The method of claim 15, wherein the at least one energy wheel comprises a desiccant wheel and a heat wheel.

18. The method of claim 15, further comprising monitoring a temperature and humidity of the recirculating air.

19. The method of claim 15, further comprising controlling temperature and humidity of the agricultural growing space by monitoring the temperature and humidity of the recirculating air and controlling operation of the energy wheel and a cooling coil.

20. The method of claim 15, further comprising passing the recirculating air exiting the at least one energy wheel across a cooling coil circulating a heat transfer fluid to further reduce the heat content of the recirculating air.

21. A controlled air system in combination with a greenhouse, the controlled air system comprising:
 an enthalpy wheel capable of transferring sensible and latent heat, the enthalpy wheel positioned in and rotatable through a bifurcated duct, the duct having a recirculating air portion and an outside air portion, the recirculating air portion in fluid connection with the greenhouse and one or more recirculation fans, the recirculating air portion configured to recirculate air from the greenhouse back to the greenhouse, the outside air portion in fluid connection with one or more outside air fans positioned to cause outside air to flow countercurrent to recirculating air; and
 a cooling coil within the recirculating air portion of the bifurcated duct, downstream of and in series with the enthalpy wheel, the cooling coil circulating a heat transfer fluid to remove heat from air within the recirculating air portion of the bifurcated duct, wherein
 the greenhouse and the recirculating air duct are not vented to or from the outside air.

* * * * *